Patented Dec. 31, 1935

2,026,219

UNITED STATES PATENT OFFICE 2,026,219

PROCESS FOR BREAKING PETROLEUM EMULSIONS

Melvin De Groote, St. Louis, and Bernhard Keiser, Webster Groves, Mo., assignors to Tretolite Company, Webster Groves, Mo., a corporation of Missouri No Drawing. Application January 30, 1935, Serial No. 4,088

7 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil" and "bottom settlings".

The object of our invention is to provide a novel and inexpensive process for separating emulsions of the character referred to into their component parts of oil and water or brine.

Briefly described, our process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The treating agent or demulsifying agent contemplated by our process consists of or comprises a sulfite fatty body addition product, the term "sulfite" being herein used in a broad sense to include —bisulfites—. Such materials, i. e., sulfite, or bisulfite addition products, are well known compositions of matters and are described in British Patent No. 387,693, of 1931, to I. G. Farbenindustrie A. G., and in the publication "Chemistry of Petroleum Derivatives", Ellis, 1934, page 576. The procedure employed to produce such materials is also well known, it being common knowledge that if a concentrated solution of sodium bisulfite of 38° Baumé is agitated vigorously with a true drying oil, particularly linseed oil, or some simple derivative thereof, that a water-soluble product is formed. Instead of linseed oil, one may use China wood oil, perilla oil, or even highly unsaturated marine oils, including train oil. Instead of employing the glycerol ester of linseed oil fatty acids, or some other glyceride, one may employ the fatty acids themselves, or the ethyl ester, or methyl ester, or the glycol ester of linseed oil fatty acids or any similar ester derived from a suitable alcohol and a suitable fatty acid. Reagents produced by reactions of sulfites or bisulfites with fatty materials other than naturally-occurring glycerides, are generally more expensive to manufacture, and therefore, it is preferable to use the addition product of a naturally-occurring glyceride, such as linseed oil, unless one of the other reagents described is decidedly more effective.

Sulfite addition products, for instance, bisulfite addition products, may also be obtained from octadecadiene-9, 11-acid-1, or its amide, as described in U. S. Patent No. 1,920,585, to Ott and Schussler, dated August 1, 1933, or from the glyceride thereof obtained directly from triricinolein, instead of from ricinoleic acid. It is well known, of course, that octadecadiene-9, 11-acid-1, or its amide are not fatty materials in the sense that the every-day fatty acids occur naturally in fats. This reagent is obtained by the dehydration of ricinoleic acid bodies. However, from the very chemical nature of octadecadiene-9, 11-acid-1 (or its glyceride) it is to be expected that its properties would be similar to certain naturally-occurring fatty acids, and thus, for the particular purpose herein described will be considered as a fatty material. In reactions of the various kinds just described sodium bisulfite is most advantageously employed, because of its low cost. Other alkali metal bisulfites, such as the potassium or ammonium bisulfites may be employed. In certain instances sulfur dioxide gas may be reacted jointly in the presence of a base, such as triethanolamine, and the same effect is obtained as if a bisulfite were present.

The formation of sulfite addition products is not limited to the methods previously described, but one may also employ the methods described in U. S. Patent No. 1,851,102, to Kalischer and Keller, dated March 29, 1932. The method there employed consists essentially in reacting sulfites or bisulfites on a water-soluble salt of a halogenated higher fatty acid of the general formula:

$$C_nH_{2n-1-x-m}R_mHal_x\text{—COOH}$$

wherein R means hydrogen or hydroxyl, $m$ the number 1 or more, $n$ a number more than 8 and $x$ 1 or more, so as to produce sulfo derivatives of higher fatty acids.

Products derived from halogenated saturated fatty acids, by means of sulfites, are described in British Patent No. 343,071, of 1929, to I. G. Farbenindustrie A. G. Although such products are substitution products of saturated fatty acids, they may be considered as addition products of unsaturated fatty acids, so as to be considered within the scope of reagents employed as the treating agent or demulsifying agent of our process.

Fatty acid sulfates, or true fatty sulfonic acids, may be produced by treating unsaturated fatty acids or their glycerides with sulfuric acid under various conditions. True fatty sulfonic acids are distinguished by the fact that they are not appreciably decomposed by boiling for a relatively long period, with dilute hydrochloric acid, whereas, under the same conditions, fatty acid sulfates are readily decomposed. Therefore, it is not unusual that it is sometimes assumed that any fatty derivative obtained in a manner similar to sulfation or sulfonation must yield either a fatty acid sulfate or a fatty acid sulfonate. Furthermore, it is well known that certain organic compounds containing a carbonyl group, such as aldehydes and ketones, will react with sodium bisulfite to form true sulfonic acids or hydroxy sulfonic acids, and such compounds show the typical resistance of sulfonic acids to boiling with dilute hydrochloric acid. When one contemplates the reaction between linseed oil, for example, and sodium bisulfite, it is not so easy to determine the exact reaction which takes place. In the first place, it is possible that the reagent, on contact with linseed oil, causes a shift in the ethylene linkages, so as to produce conjugated ethylene linkages typical of China wood oil (see U. S. Patent No. 1,896,467, to Scheiber, dated February 7, 1933). In any event, if sulfuric acid acted upon linolenic acid, for example, to produce a true sulfonic acid, one would anticipate a hydroxyl radical and a sulfonic acid radical, for example, $HSO_3$ saturating an ethylene linkage or the extremes of two ethylene linkages, comparable to the action of a halogen. (See Textbook of Organic Chemistry, Bernthsen, 1931 Ed., p. 842.) If this material were neutralized with caustic soda, for example, the sulfonic acid radical would be changed into an $SO_3Na$ radical. Sodium bisulfite, for example, is characterized by the formula $NaHSO_3$. Thus, if one assumes that the addition product formed by reaction between sodium bisulfite and linseed oil is formed in a similar manner, one would expect an ethylene linkage to be saturated with a hydrogen atom and an $NaSO_3$ radical. This assumption appears untenable, because the product obtained by reaction between linseed oil and sodium bisulfite can be readily decomposed by boiling with hydrochloric acid, which seems to indicate that it is not a true sulfonic acid. Since it is customary to agitate the mixed linseed oil sodium bisulfite mass with air during reaction, it has been assumed at times that the linseed oil oxidized to form an aldehyde or ketone body, which then combined with the bisulfite. This explanation is also untenable, in view of the fact that the reaction between linseed oil and sodium bisulfite can be conducted in an atmosphere of carbon dioxide, thus precluding the formation of aldehydes or ketones. Furthermore, bearing in mind that sulfites which are very water-soluble, as, for example, ammonium sulfite, or potassium sulfite, will also serve to react with linseed oil, it becomes apparent that one cannot contemplate an ammonium radical or potassium atom partially saturating an ethylene linkage.

The exact composition of the sulfo derivatives formed in the manners previously referred to appears to be intimately related to the composition of sulfites themselves. For instance, it is believed that in certain reactions sulfites may act as if a sulfonic acid radical were present. In such instances, the composition is best indicated by the formula $Na_2SO_3$. In other instances, reactions of sulfites may be better explained by assuming the presence of a sulfonyl radical and indicating the composition thus:

$$(NaO)_2SO$$

Similarly, the composition of sodium bisulfite would be indicated $NaO.OH.SO$. Based on what has been previously stated, it is believed that the sulfo addition products, are possibly characterized by the introduction of a sulfonyl radical, which is less polar and less hydrophile than either a sulfate radical or a sulfonic acid radical, and which perhaps is more resistant to decomposition with dilute hydrochloric acid than a fatty sulfate and not as resistant to decomposition with hydrochloric acid as a true sulfonic acid.

As previously stated, our invention consists in using a sulfite fatty body addition product of the kind above described, to constitute or form part of the demulsifying agent that is employed to break a petroleum emulsion of the water-in-oil type. We have found that in some instances such a demulsifying agent will break petroleum emulsions more readily than demulsifying agents formed from fatty sulfates or fatty sulfonates. In producing the demulsifying agent contemplated by our process we prefer to use bisulfites on account of their relatively low cost, and because they are highly reactive and form a very concentrated solution in water. This latter characteristic is particularly important, because in many instances the formation of an addition product is hastened by the absence of water, or by the presence of a minimum amount of water. In practicing our process we prefer to use a demulsifying agent produced by adding approximately 500 lbs. of ordinary linseed oil to approximately 500 lbs. of 38° Baumé sodium bisulfite solution, and then subjecting the mass to vigorous agitation at a temperature of approximately 90 to 100° C. until a clear water-soluble solution is formed. The final water-soluble product shows substantially no acidic reaction and is not corrosive. One may separate the fatty acid addition product by means of sodium chloride in the same manner as described in the Ott and Schussler patent, previously referred to. However, the excess of sodium bisulfite present is not objectionable, and we prefer to use the material simply as is, either alone or in combination with other suitable reagents which form a compatible mixture with the linseed oil bisulfite addition product. In the event linseed oil fatty acids are used, then one, of course, can neutralize the carboxyl hydrogen in any suitable manner, or convert the material into a salt, or an ester. The same is true of the acids obtained in the manner described in the Kalisch and Keller patent, previously referred to. Triethanolamine or similar basic amines may be used for neutralization.

The use of demulsifying agents consisting of various sulfo acids, or carboxy acids, or compounds having both a sulfo group and a carboxyl group, is well known in the treatment of water-in-oil emulsions. In the use of conventional demulsifying agents it is the common practice to use them not only in the form of acids, but also in the form of salts or esters, or half salts, or half esters, or ester salts, in case of dibasic acids. Where such reagents have both a carboxylic hydrogen and a sulfonic hydrogen, it is well known that only the sulfonic hydrogen need be neutralized, if desired. The salts generally employed are the sodium salt, potassium salt, ammonium salt, calcium, magnesium, the triethanolamine salt, etc. The esters may be employed, such as the methyl ester, ethyl ester, propyl ester, butyl ester, amyl ester, hexyl ester, octyl ester, etc. Aromatic or cyclic esters may be employed. What has been said in regard to the use of conventional demulsifying agents applies also to the materials employed as the demulsifying agent of our process.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc. may be employed as diluents. Similarly, the material or materials employed as the demulsifying agent of our process may be admixed with one or more of the solvents customarily used in connection with conventional demulsifying agents. Moreover, said material or materials may be used alone or in admixture with other suitable well known classes of demulsifying agents, such as demulsifying agents of the modified fatty acid type, the petroleum sulfonate type, the alkylated sulfo-aromatic type, etc.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000, or 1 to 20,000, or 1 to 30,000, such an apparent insolubility in oil and water is not significant, because said reagents undoubtedly have solubility within the concentration employed. This same fact is true in regard to the material or materials employed as the demulsifying agent of our process.

It has been so common to use a conventional demulsifying agent derived from an acid in the form of the acid itself, or in the form of a salt, or in the form of an ester, that the expression "acid body" is frequently employed to mean the acid itself, or an ester thereof, or a salt thereof. The word "body" is herein employed in this same sense in conformity with its prior usage, in the trade, and particularly in various patents of the prior art. Half salts and half esters are considered as salts and esters, respectively.

Having thus described our invention, what we claim as new and desire to secure by Letters Patent is:

1. A process for breaking a petroleum emulsion of the water-in-oil type, which consists in subjecting the emulsion to the action of a demulsifying agent comprising a sulfite addition product derived by reaction between a water-soluble sulfite and an unsaturated reactive fatty material.

2. A process for breaking a petroleum emulsion of the water-in-oil type, which consists in subjecting the emulsion to the action of a demulsifying agent comprising a sulfite addition product derived by reaction between a water-soluble sulfite and linseed oil.

3. A process for breaking a petroleum emulsion of the water-in-oil type, which consists in subjecting the emulsion to the action of a demulsifying agent comprising a bisulfite addition product derived by reaction between a water-soluble bisulfite and linseed oil.

4. A process for breaking a petroleum emulsion of the water-in-oil type, which consists in subjecting the emulsion to the action of a demulsifying agent comprising a bisulfite addition product obtained by reaction between sodium bisulfite and linseed oil.

5. A process for breaking a petroleum emulsion of the water-in-oil type, which consists in subjecting the emulsion to the action of a demulsifying agent obtained by reacting linseed oil with an approximately equal weight of 38° Baumé sodium bisulfite solution at approximately 90 to 100° C. until the resultant product is completely water-soluble.

6. A process for breaking a petroleum emulsion of the water-in-oil type, which consists in subjecting the emulsion to the action of a demulsifying agent comprising a sulfite addition product derived by reaction between a water-soluble sulfite and an octadecadiene-9, 11-acid-1 body.

7. A process for breaking a petroleum emulsion of the water-in-oil type, which consists in subjecting the emulsion to the action of a demulsifying agent comprising a sulfite addition product derived by reaction between a water-soluble sulfite and a water-soluble salt of a halogenated higher fatty acid of the general formula:

$$C_nH_{2n-1-x-m}R_mHal_x\text{---COOH}$$

wherein R means hydrogen or hydroxyl, $m$ the number 1 or more, $n$ a number more than 8 and $x$ 1 or more.

MELVIN DE GROOTE.
BERNHARD KEISER.